United States Patent Office 3,444,119
Patented May 13, 1969

3,444,119
MODIFIED PHENOLIC RESIN CONTAINING EPOXY SUBSTITUTED SILANE
John R. Le Blanc, Wilbraham, Mass., assignor to Monsanto Company, St. Louis, Mo., a corporation of Delaware
No Drawing. Continuation-in-part of application Ser. No. 321,404, Nov. 5, 1963. This application Aug. 9, 1967, Ser. No. 659,328
Int. Cl. C08g 37/08, 37/14
U.S. Cl. 260—29.3                              5 Claims

ABSTRACT OF THE DISCLOSURE

Storage stable, water dilutable, dicyandiamide and/or urea modified phenolic resin systems adapted for use as a fibrous material binder and containing small amounts of glycidoxy substituted trialkoxy silane. These systems, when thermoset, display excellent moisture resistance.

Cross-references

This application is a continuation-in-part of copending U.S. application, Ser. No. 321,404, filed Nov. 5, 1963, now abandoned.

Background

Liquid phenolic resins are widely used as binders for various applications, especially for fibrous materials. Generally, in use, such a resin is applied in a water diluted liquid form to the fibrous mataerials to be bonded, such as glass fibers, or the like, and then the resulting mixture is subjected to elevated temperatures in order to advance the resin to an infusible, thermoset state.

A class of liquid phenolic resins which are particularly useful as binders are dicyandiamide and/or urea modified phenol-formaldehyde resins. Owing both to the known methods for their manufacture, and to their inherent chemical and physical characteristics, so modified phenol-formaldehyde resins intended for use as binders are usually made first in the form of concentrated aqueous solutions which are then diluted with water before use. Obviously, for such a concentrated liquid phenolic to be useful from a practical, commercial standpoint as a binder, it must be both storage stable (for shipment, handling, and on-sight storage) and water dilutable (without appreciable solution decomposition or appreciable deterioration of binder properties). Additive-free, so modified phenol-formaldehyde liquid resins are characteristically both storage stable and water dilutable.

However, dicyandiamide and/or urea modified phenol-formaldehyde resins, when thermoset, characteristically display relatively poor bond strength stability in the presence of relatively high amounts of environmental moisture (that is, they have poor moisture resistance).

As a result of this characteristic, for many applications, the usefulness of so modified phenol-formaldehyde resins as binders has heretofore been necessarily limited.

Although it is known that phenol-formaldehyde resins as such characteristically display when thermoset relatively poor environmental heat stability (including such properties as tensile strength, heat resistance, flammability, and punk resistance), dicyandiamide and/or urea modified phenol-formaldehyde resins have heretofore been developed (see Mestdagh et al. U.S. Patent No. 3,004,941, issued Oct. 17, 1961) to overcome this undesirable characteristic, so that it is now practical to use such modified phenol-formaldehyde resins even in those binder applications where environmental heat stability must be considered. Nevertheless, even this so modified phenol-formaldehyde thermoset resin has heretofore had by itself relatively poor moisture resistance.

The art has heretofore appreciated generally that the addition of organo silanes in small amounts to phenol-formaldehyde resins before they are thermoset tends to markedly improve their moisture resistance. However, it is a general characteristic of organo silanes that, when they are added to aqueous liquid dicyandiamide and/or urea modified phenol-formaldehyde resins, either they substantially reduce (or even eliminate) storage stability of the liquid phenolic, or they substantially reduce (or even eliminate) water dilutability of the liquid phenolic, or both. Consequently, commercial utilization of organo silanes as additives to such liquid modified phenol-formaldehyde resins has heretofore generally not been feasible.

It has now been surprisingly discovered that by dissolving small quantities of a glycidoxy substituted trialkoxy silane into an aqueous liquid dicyandiamide and/or urea modified phenol-formaldehyde resin system, the resulting resin system achieves vastly increased thermoset moisture resistance while unexpectedly maintaining the desirable properties of storage stability and water-dilutability. Furthermore, the desirable environmental heat stability characteristics (heat resistance, flame retardation, punking resistance) of thermoset so modified phenol-formaldehyde resins are not appreciably affected by such incorporation.

Summary

The present invention is directed to surprisingly storage stable dicyandiamide and/or urea phenol-formaldehyde resin compositions which are adapted for use as a binder. Such a composition comprises (dry weight basis) a mixture of from about 0.001 to 2 weight percent of at least one glycidoxy substituted trialkoxy silane, and, correspondingly, the balance up to 100 weight percent of at least one modified phenol-formaldehyde resin. The glycidoxy substituted trialkoxy silane is characterized by having the generic formula:

(I)    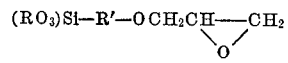

where R is an alkyl radical containing less than 9 carbon atoms, and R' is an alkylene radical containing less than 9 carbon atoms, and the modified phenol-formaldehyde resin is a product produced by first condensing from about 1.5 to 5 mols of formaldehyde per mol of phenol and then thereafter modifying the resulting condensate with a formaldehyde condensation product formed by condensing formaldehyde with a modifier selected from the group consisting of dicyandiamide and urea such that the mol ratio of said modifier to said formaldehyde in such formaldehyde condensation product ranges from about 0.5 to 5.

Such a composition of this invention is usually prepared in the form of an aqueous liquid resin concentrate which has surprising and unexpected water dilutability even after periods of prolonged storage. Thus, such compositions can be prepared in the form of aqueous concentrates wherein the total weight percent of the foregoing mixture (dry weight basis) dissolved in water ranges from about 25 percent to 80 percent, and, preferably, is from about 40 percent to 70 percent. Such liquid concentrates can be diluted with water so as to form liquid resin systems usable as binders wherein the total weight percent of the foregoing mixture (dry weight basis) is as small as about 1 percent, or even smaller, although preferably this percentage ranges from about 2 percent to 5 percent.

A cured (thermoset) resin composition of this invention has substantially improved moisture resistance compared to corresponding silane-free compositions as determined by bond strength. Surprisingly, the addition of a Formula I silane in an amount as small as about 0.001 weight percent (based on the total weight of combined solids) in a composition not only improves moisture resistance of a cured (thermoset) resin, but also does not adversely affect either the storage stability of an aqueous liquid resin composition of this invention, or the subsequent water dilutability of such resin. The bond strength of a thermoset resin containing a silane as taught by this invention is not appreciably affected by storage of a liquid resin composition.

Suitable modified phenol-formaldehyde resins for use in this invention may be made by techniques taught by Mestdagh et al. in U.S. Patent 3,004,941. Thus, a modified phenol-formaldehyde resin usable in this invention can be prepared by first condensing from about 1.5 to 5 mols of formaldehyde per mol of phenol. Preferentially, the condensation is accomplished using an alkaline catalyst. The condensation is continued until a predetermined free formaldehyde content is reached, as determined, for example, by the hydroxylamine hydrochloride test. A suitable free-formaldehyde content is about 9–15 weight percent based on total weight of starting reactants. The formaldehyde used in the starting reactants can be in the ratio range of about 1.5 to 5 mols per mol of phenol, and, preferably, ranges from about 1.5 to 3.5 mols of formaldehyde per mol of phenol. Such aqueous condensation product of phenol and formaldehyde, having the excess formaldehyde, is cooled to about 30 to 50° C. The modifier (dicyandiamide, or urea, or mixture of dicyandiamide and urea) is then added in such a proportion that the ratio is generally, and, preferably, about 1 mol of the modifier to about 0.5 to 2.0 mols of formaldehyde in the resulting formaldehyde condensation product with dicyandiamide and/or urea and, more preferably, about 1.2 to 1.6 mols of formaldehyde. To this product is then added a silane of Formula I in the amounts desired. When employing a mixture of dicyandiamide and urea, the mixture can consist of from about 10 to 90 weight percent of dicyandiamide and, correspondingly, about 90 to 10 weight percent of urea.

Alternatively, the process for preparing a modified phenol-formaldehyde resin for use in this invention can be accomplished by reacting dicyandiamide, or urea, or mixture of dicyandiamide and urea, with formaldehyde in the presence of an alkaline catalyzed reaction product of phenol-formaldehyde having no excess free formaldehyde. This process can be initiated by first reacting phenol with formaldehyde under alkaline catalyzed conditions to provide a water-dilutable condensate of phenol-formaldehyde having no free formaldehyde. The ratio of formaldehyde to phenol, and of modifier to formaldehyde remains as above indicated. A silane of Formula I is then added in the amounts desired.

Other methods known to the art can be used for preparing such a modified resin for use in this invention. Typically, such methods involve the separate preparation of a phenol-formaldehyde condensate resin composition which is initially not only water soluble but also water dilutable to the extent desired. The dicyandiamide and/or urea formaldehyde condensation product, as those skilled in the art will appreciate, can be prepared separately by conventional techniques in the form of a resin which is not only water soluble, but also water dilutable to the extent desired. Such a separately prepared formaldehyde condensation product with dicyandiamide or urea can have a mol ratio of dicyandiamide and/or urea to formaldehyde of from about 0.5 to 5. The resin is then added to the preformed phenol-formaldehyde resin. Such modified resins are then mixed together with a silane of Formula I. Preferably modified phenol-formaldehyde resins for use in this invention have a total nitrogen content ranging from about 3 to 12 weight percent (dry weight basis), and, in general, this nitrogen content is less than 18 weight percent.

It is to be noted that, when preparing a resin composition of this invention, the chemical composition of such a modified phenol-formaldehyde resin can itself vary. For example, although during the reaction of the condensates, the phenol, the dicyandiamide, and/or the urea will preferentially react with the formaldehyde, it is expected that certain other reaction products will also form during the condensation reaction. These products would be, for example, a phenol-dicyandiamide-formaldehyde reaction product. When employing a mixture of dicyandiamide and urea, a phenol-dicyandiamide-urea-formaldehyde reaction product can form as well as a mixture of phenol - dicyandiamide - formaldehyde, phenol-dicyandiamide-urea-formaldehyde and phenol-urea-formaldehyde reaction products. It is understood that these reaction products would only exist in minor amounts with the predominant portion of the condensation reaction products being phenol-formaldehyde and dicyandiamide-formaldehyde or mixtures of dicyandiamide-formaldehyde and urea-formaldehyde.

As stated previously, in addition to the storage stability and the water dilutability associated with liquid resin compositions of this invention, the cured thermoset resins formed therefrom have excellent moisture resistance. The desirable properties associated with thermoset so modified phenol-formaldehyde resins are in general not adversely affected by the addition of a silane of Formula I as taught by this invention. Thus, the improved environmental heat stability (including heat resistance, punking resistance and flame retardance) associated with such thermoset so modified phenol-formaldehyde resins is not appreciably affected by such silane addition, and, at the same time, moisture resistance thereof is improved, as indicated above.

Preferred silanes of Formula I are those wherein R contains less than three carbon atoms and R' contains from 2 through 4 carbon atoms. Mixtures of Formula I silanes can be employed.

Specific examples of glycidoxy substituted trialkoxy silanes that can be employed in this invention include glycidoxypropyl triethoxy silane, glycidoxypropyl tributoxy silane, glycidoxypropyl trimethoxy silane, and the like. The most preferred trialkoxy silane of Formula I for use in this invention is glycidoxypropyl trimethoxy silane.

In some cases, it may be desirable to add the Formula I silane to the starting resin as a solvent solution. Water or any of the well-known organic solvents which are inert towards resin and silane can be used, such as the organic alcohols, acetone, dioxane, etc.

The amount of Formula I silane employed in the practice of this invention can generally be any amount to give added moisture resistance to the starting resin when it is advanced to the infusible state (thermoset), and can be preferably up to about 2.0 weight percent based on the total combined dry weight of the total solids comprising a composition of this invention. The amount employed can be as little as 0.001 weight percent, or as high as the upper limit of precipitation of silane will dictate in any given composition of this invention. This upper limit of precipitation (and including possible gelation of the silane) appears to generally occur when employing more than about 2.0 weight percent of the silane. Generally, when less than about 0.001 weight percent of the silane is employed, no apparent upgrading of the moisture resistance is obtained. Therefore, in the practice of this invention, the amount of the Formula I silane employed should vary between about 0.001 and 2 weight percent thereof based on the total combined dry weight of the solids comprising a composition of the invention, and, preferably, varies about 0.001 to 1.0 weight percent thereof.

The storage stability and the water dilutability of a composition of this invention are demonstrated by the substantial absence of haziness or cloudiness in a liquid resin composition of the invention after storage or after dilution thereof with water (as before or after a period of storage). It is understood herein that the terms "haziness" or "cloudiness" both refer to the appearance in a concentrated or a diluted resin composition of finely suspended particles visible to the naked eye.

When a resin composition of this invention is used as a binder in bonding fibrous materials, such as glass fibers for thermal insulation products, such resin composition, when advanced or cured to the infusible state (thermoset), is punk-resistant, heat-resistant, and flame-retardant. In addition, such cured resin maintains its bonding strength when subjected to moisture. The bonding strength of such cured (thermoset) resin is characteristically highly resistant to moisture degradation.

The resin of this invention may be applied in either concentrated or diluted aqueous liquid form. The bonding strength is not affected in either case. The water dilutability of an aqueous liquid resin composition of this invention is excellent and such compositions are considered to be infinitely water-dilutable without the formation or occurrence of haziness or cloudiness. Thus, a concentrated liquid resin composition of this invention can be generally diluted with about 24 volumes or more of water without exhibiting haziness or cloudiness. Generally, in the art, a phenolic liquid resin is considered to be infinitely water-dilutable if it is diluted with about 24 volumes of water without appreciable formation of haziness or cloudiness.

The resin compositions of this invention especially in the form of diluted liquids find use in the bonding of glass fibers, or rock wool fibers, for thermal insulation products. The resin compositions of this invention also find applications as binders for glass fibers, sand, sand binding, rock wool, and cellulosic product binding, (as in electrical insulation, filters, etc. and the like. Further, the resin compositions of this invention can be successfully employed as binders in laminates, surface coatings, impregnants, adhesives, and the like.

Embodiments

The following examples are set forth to illustrate more clearly the principles and practices of this invention to one skilled in the art and they are not intended to be restrictive but merely to be illustrative of the invention herein contained. Unless otherwise stated therein, all parts and percentages are on a weight basis.

Example I

To a reaction vessel fitted with an agitator, a heater, and a condenser adapted for refluxing under vacuum conditions are added 100 parts of phenol, 340 parts of 37 percent formalin and 3.7 parts of sodium hydroxide to provide a pH of about 8.5–9.0. The vessel is evacuated and the mixture is allowed to react by providing a temperature of about 70° C. Reaction is continued until the free formaldehyde in the reaction mixture drops to a predetermined content of approximately 12.0 percent by weight of the reaction mixture as determined by the hydroxylamine hydrochloride test. The product is then cooled to 40–50° C. and the pH adjusted to 7.5–8.0 by the addition of boric acid. The reaction mixture at this point is water-dilutable in that 9 or more volumes of water may be mixed with 1 volume of the reaction mixture at a temperature of 24–26° C. without causing the mixture to exhibit haziness or cloudiness. Forty parts of dicyandiamide (based on reaction product) and are then added and then the mixture is heated to 60–70° C. When the dicyandiamide becomes dissolved, or about the time the reaction mixture reaches 60–70° C., the reaction is arrested by cooling to about 40° C. To this is then added about 0.01 weight percent of glycidoxypropyl triethoxy silane based on the total dry combined weight of solids. The reaction is then cooled to room temperature.

The product is an aqueous liquid concentrate composition of the invention containing about 45 weight percent total dissolved solids. This product contains a total nitrogen content (dry weight basis of 6 to 8 percent). This product is promptly diluted with 9 volumes of water to a resin solids content of about 5 weight percent without exhibiting haziness or cloudiness.

This product is storage stable as shown by the fact that a sample thereof displays substantially no haziness or cloudiness after standing for 14 days in a closed vessel. When this sample is thereafter diluted with first 9 and then with 24 parts of water, substantially no haziness or cloudiness is observed.

The freshly made and diluted resin product as prepared herein is designated as (a1), while the stored and then diluted resin product as prepared herein is designated as (a2).

Example II

To a reaction vessel fitted with an agitator, a heater, and a condenser adapted for refluxing under vacuum conditions are added 100 parts of phenol, 300 parts of 50 percent formalin, and 3.0 parts of calcium hydroxide (dry weight basis) to provide a pH of 8.5–9.0 in the starting reaction mixture. The mixture is allowed to react at a temperature of about 70° C. under vacuum. Reaction is continued until the free-formaldehyde in the reaction mixture drops to a predetermined content of about 11 percent by weight as determined by the hydroxylamine hydrochloride test. The product is cooled to 40–50° C. The reaction mixture at this point is water-dilutable in that 9 or more volumes of water may be mixed with 1 volume of the reaction mixture at a temperature of 24–26° C. without causing the mixture to exhibit haziness or cloudiness. To this product is added 35 parts of dicyandiamide. The resulting mixture is heated to 50° C. for about 20 minutes. The reaction mixture is then cooled to about 30° C. and 7 parts of urea are added. The mixture is then cooled to 20° C. and neutralized with carbon dioxide. To this mixture is added 0.05 weight percent of glycidoxypropyl trimethoxy silane based on the total dry weight of this whole composition. This silane is added as a 10 percent solution of silane in acetone. (Alternatively, the silane can be added as in the form of an aqueous solution.) The product is then filtered to remove calcium carbonate. This product is an aqueous liquid concentrate composition of the invention containing about 45 weight percent total dissolved solids. This product contains a total nitrogen content (dry weight basis) of 6 to 8 percent. This product is diluted with 9 parts of water to a resin solids content of about 5 weight percent without exhibiting haziness or cloudiness.

This product is storage stable as shown by the fact that a sample of the product displays substantially no haziness or cloudiness after standing for 14 days in a closed vessel. When this sample is diluted with first 9, and then with 24 parts of water, it is found that substantially no haziness or cloudiness is observed.

The freshly made and diluted resin product as prepared herein is designated as (b1), while the stored and then diluted resin product as prepared herein is designated as (b2).

Example III

A phenol-formaldehyde liquid resin is prepared as in Example I. Separately, in a similar reactor, 100 parts by weight of urea are reacted with 80 parts by weight of 50 percent formalin at a pH of 8.5–9.0. The resins are mixed in a ratio of 2 parts phenolic resin and 1 part urea resin. To this resin mixture is added 0.8 percent glycidoxypropyl trimethoxy silane. The resulting product has a nitrogen content of about 7 percent. This product is an aqueous liquid concentrate composition of the invention containing about 45 weight percent total dissolved solids. This product is diluted with 9 parts of water to a resin solids content of about 5 weight percent without exhibiting haziness or cloudiness.

This product is storage stable as shown by the fact that a sample of the product displays substantially no haziness or cloudiness after standing for 14 days in a closed vessel. When this sample is diluted with first 9, and then with 24 parts of water, it is found that substantially no haziness or cloudiness is observed.

The freshly made and diluted resin product as prepared herein is designated as (c1), while the stored and then diluted resin product as prepared herein is designated as (c2).

Example IV

This example shows the effect of moisture on the bond strength of the resins of Examples I, II and III above. To show this strength behavior, test specimens are prepared by joining, with a drop of resin, two glass fibers measuring about 2 inches long and about 9 mils in diameter and wherein the glass fibers are joined at right angles to one another. The test specimens so prepared are dried at 90° C. for about 90 minutes and then cured in an air-circulating oven at about 177° C. for about 15 minutes. The bond strength is determined by applying a stress load to the test specimen and noting the time required to separate the fibers. While applying the stress load, live steam at 100° C. is directed at the bonded interface of the two fibers. The relative humidity at the bonded interface is 100 percent. The actual test is conducted by securing one glass fiber member of the test specimen in a clamping device and then applying the stress load to the other glass fiber member of the test specimen. The stress load applied to the specimens is measured in dynes per square centimeter and the time to fail is measured in minutes. The results obtained as set forth in Table 1 are the average of three test specimens for each resin.

TABLE 1

| Resin | Stress load, dynes/cm.$^2 \times 10^6$ | Time to fail, minutes |
|---|---|---|
| a [1] | 10 | 2 |
| a1 | 50 | 40 |
| a2 | 50 | 38 |
| b [2] | 10 | 4 |
| b1 | 50 | 100 |
| b2 | 50 | 100 |
| c [3] | 10 | 1 |
| c1 | 50 | 100 |
| c2 | 50 | 100 |

[1] Resin (a) is a control sample of freshly made resin of Example I containing no silane.
[2] Resin (b) is a control sample of freshly made resin of Example II containing no silane.
[3] Resin (c) is a control sample of freshly made resin of Example III containing no silane.

The above results show that when using the resin compositions of this invention, substantial increases in moisture resistance are obtained compared to silane-free resins. In addition, there is no loss in bonding strength after storage of resin concentrate before dilution thereof.

What is claimed is:

1. A storage stable water-dilutable, modified phenol-formaldehyde liquid resin composition adapted for use as a binder and which when thermoset has moisture resistance, said composition comprising:
    an aqueous solution containing from about 1 to 80 total weight percent solids (dry weight basis),
    said solids comprising (dry weight basis) a mixture of from about 0.001 to 2 weight percent of at least one glycidoxy trialkoxy-silane, and, correspondingly, the balance up to 100 weight percent of at least one phenol-formaldehyde resin,
    said glycidoxy trialkoxy silane being characterized by having the generic formula:

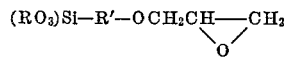

where R is an alkyl radical containing less than 9 carbon atoms, and R' is an alkylene radical containing less than 9 carbon atoms, and
    said phenol-formaldehyde resin being a product produced by first condensing from about 1.5 to 5 mols of formaldehyde per mol of phenol and then thereafter modifying the resulting condensate with a formaldehyde condensation product formed by condensing formaldehyde with a modifier selected from the group consisting of dicyandiamide and urea, such that the mol ratio of said modifier to said formaldehyde in said formaldehyde condensation product ranges from about 0.5 to 5.

2. The composition of claim 1 wherein said mixture is in an aqueous solution wherein the total weight percent solids ranges from about 25 to 80.

3. The composition of claim 1 wherein said modifier is dicyandiamide.

4. The composition of claim 1 wherein said mixture is in an aqueous solution wherein the total weight percent solids ranges from about 2 to 5.

5. A storage stable water-dilutable, modified phenol-formaldehyde liquid resin composition adapted for use as a binder and which when thermoset has moisture resistance, said composition comprising:
    an aqueous solution containing from about 1 to 80 total weight percent solids (dry weight basis).
    said solids comprising (dry weight basis) a mixture of from about 0.001 to 2 weight percent of glycidoxypropyl trimethoxy silane, and, correspondingly, the balance up to 100 weight percent of at least one phenol-formaldehyde resin, and
    said phenol-formaldehyde resin being a product produced by first condensing from about 1.5 to 5 mols of formaldehyde per mol of phenol and then thereafter modifying the resulting condensate with a formaldehyde condensation product formed by condensing formaldehyde with a modifier selected from the group consisting of dicyandiamide and urea, such that the mol ratio of said modifier to said formaldehyde in said formaldehyde condensation product ranges from about 0.5 to 5.

References Cited

UNITED STATES PATENTS

| 2,946,701 | 7/1960 | Plueddemann. | |
| 3,072,595 | 1/1963 | Barth et al. | 260—29.3 |
| 3,215,585 | 11/1965 | Kneipple | 260—826 |
| 3,223,668 | 12/1965 | Stalego | 260—29.3 |

MURRAY TILLMAN, *Primary Examiner.*

JOHN C. BLEUTGE, *Assistant Examiner.*

U.S. Cl. X.R.

117—126; 260—826